United States Patent
Moore

[11] Patent Number: 5,912,988
[45] Date of Patent: Jun. 15, 1999

[54] IMAGE PROCESSING METHOD AND APPARATUS FOR DISTORTION COMPENSATION

[75] Inventor: Larry R. Moore, Tempe, Ariz.

[73] Assignee: Xytec Corporation, Tempe, Ariz.

[21] Appl. No.: 08/774,020

[22] Filed: Dec. 27, 1996

[51] Int. Cl.[6] .................................................. G06K 9/62
[52] U.S. Cl. .......................... 382/209; 382/221; 382/112
[58] Field of Search ................................... 382/209, 221, 382/112, 149

[56] References Cited

U.S. PATENT DOCUMENTS

| | | | |
|---|---|---|---|
| 3,576,534 | 4/1971 | Steinberger | 340/146.3 |
| 4,021,776 | 5/1977 | Tech | 340/146.3 MA |
| 4,131,879 | 12/1978 | Ehrat | 340/146.3 H |
| 4,143,279 | 3/1979 | Ehrat et al. | 250/556 |
| 4,208,652 | 6/1980 | Marshall | 340/146.3 Y |
| 4,288,781 | 9/1981 | Sellner et al. | 340/146.3 Q |
| 4,303,832 | 12/1981 | Ehrat | 250/556 |
| 4,308,523 | 12/1981 | Schapira | 340/146.3 Q |
| 4,628,533 | 12/1986 | Hongo et al. | 382/27 |
| 4,633,504 | 12/1986 | Wihl | 382/149 |
| 4,736,438 | 4/1988 | Persoon et al. | 382/34 |
| 4,802,231 | 1/1989 | Davis | 382/34 |
| 4,860,371 | 8/1989 | Matsuyama et al. | 382/149 |
| 5,014,330 | 5/1991 | Kobayashi et al. | 382/30 |
| 5,020,110 | 5/1991 | Chominski | 382/7 |
| 5,067,161 | 11/1991 | Mikami et al. | 382/1 |
| 5,077,805 | 12/1991 | Tan | 382/7 |
| 5,101,441 | 3/1992 | Yamaguchi | 382/30 |
| 5,144,566 | 9/1992 | Anderson et al. | 364/552 |
| 5,199,543 | 4/1993 | Kamagami et al. | 194/207 |
| 5,220,617 | 6/1993 | Bird et al. | 382/149 |
| 5,255,331 | 10/1993 | Kelly | 382/112 |
| 5,305,392 | 4/1994 | Longest, Jr. et al. | 382/8 |
| 5,321,772 | 6/1994 | Sawyer | 382/30 |
| 5,363,454 | 11/1994 | Udagawa et al. | 382/17 |
| 5,404,411 | 4/1995 | Banton et al. | 382/209 |
| 5,481,619 | 1/1996 | Schwartz et al. | 382/141 |
| 5,574,800 | 11/1996 | Inoue et al. | 382/149 |
| 5,742,703 | 4/1998 | Lin et al. | 382/209 |
| 5,751,368 | 5/1998 | Cooper | 382/209 |

OTHER PUBLICATIONS

Athanas et al. "Real–Time Image Processing on a Custom Computing Platform", *Computer*, Feb. 1995, pp. 16–24.

*Primary Examiner*—Joseph Mancuso
*Assistant Examiner*—Gilberto Frederick, II
*Attorney, Agent, or Firm*—Stephen T. Sullivan

[57] ABSTRACT

A method is provided for analyzing an image comprising a plurality of image pixels to detect distortion within the image. The method comprises a first step of receiving image data for the image, and defining a plurality of blocks within the image data, each block comprising a plurality of adjacent image pixels; a second step of prestoring in a machine readable storage medium a plurality of template data for template pixels corresponding to the image pixels, each of the image pixels having a corresponding center template pixel; a third step of testing each of the image pixels within each of the blocks for a match with the template data, the testing including selectively and iteratively offsetting the template data relative to the center template pixel, and comparing the image pixel under test to each of the offset template data to obtain error statistics; and a fourth step of using the error statistics to select an offset for each of the blocks which provides an optimum match of the image data in a given block to the template data. An apparatus also is provided. The apparatus comprises input circuitry for receiving image data for the image from the image source, a storage medium for storing template data; and a processor for testing each of the image pixels within each of the blocks for a match with the template data. The processor preferably includes a plurality of programmable gate arrays.

24 Claims, 3 Drawing Sheets

IMAGE PROCESSING METHOD AND APPARATUS FOR DISTORTION COMPENSATION

BACKGROUND OF THE INVENTION

1. Field of the Invention

The present invention relates to image processing methods and apparatus useful, for example, in examining essentially two-dimensional surfaces. More specifically, the invention relates to such image processing methods and techniques which may be used to identify and account for distortion in the image relative to an idealized version of the image.

2. Description of the Related Art

The image processing method and apparatus of the invention have potential application in a number of areas. They are potentially applicable to virtually any image processing application in which the image to be analyzed is subject to distortion relative to an idealized version of the image. The method and apparatus are particularly useful, for example, in the printing and engraving industries where they may be used in such applications as quality control. The need for refined image processing is especially pronounced in printing applications wherein the actual printing is carried out by applying pressure to the printed substrate or specimen. The Intaglio printing process widely used in the fabrication of paper currencies is an illustrative example. In these types of printing applications, the pressure applied during the printing process causes the printed substrate or specimen to become distorted. These distortions may occur in localized regions of the image, or they may extend across substantial portions of the specimen. Quality control measures typically are employed to separate and discard the excessively distorted or flawed specimens. Distinguishing between slight distortions and other more serious defects in the resultant specimen and its image relative to the desired ideal image has been a longstanding problem.

Historically, the task of identifying impermissible distortions and removing defective specimens in the currency printing industry has been manually performed by human inspectors. This has been a relatively slow, inefficient, and costly procedure. A pronounced trend therefore has developed in recent years to automate this quality control procedure. With today's high-speed printing processes, however, and in view of the substantial computational requirements of many real-time or near real-time image processing methods designed to accommodate small amounts of distortion, the ability to automate these more demanding processes has been limited.

3. Objects of the Invention

Accordingly, an object of the present invention is to provide an image processing method and apparatus for detecting and measuring distortion in an image relative to an idealized version of the image.

Another object of the invention is to provide an image processing method and apparatus which offer the potential for detecting relative fine levels of distortion.

Another object of the invention is to provide an image processing method and apparatus which offer the potential for relatively high speed processing of images which include distortions.

Another object of the invention is to provide an image processing method and apparatus which enable relative efficient and low cost processing of images which include distortions.

Additional objects and advantages of the invention will be set forth in the description which follows, and in part will be apparent from the description, or may be learned by practice of the invention. The objects and advantages of the invention may be realized and obtained by means of the instrumentalities and combinations pointed out in the appended claims.

SUMMARY OF THE INVENTION

The invention in general terms includes methods and apparatus for processing an image of a specimen, such as a dollar bill or other bank note, a package label, and the like, to determine whether the specimen image is sufficiently similar to an idealized version of the image within certain defined tolerances to be deemed valid.

The method and apparatus may be employed in a variety of applications. In a presently preferred embodiment, they are used to analyze sheets of paper currency, such as dollar bill sheets, as they emerge from the printing process or post-printing inspection process. The preferred method and apparatus make possible the determination of whether the newly-printed bills are sufficiently true replications of the bill plate or template (the ideal version) to be accepted as valid currency. Using the preferred apparatus of the invention, this task can be accomplished at speeds comparable to the output rate of current high-speed printing processes typically employed for applications such as currency fabrication.

To achieve the foregoing objects, and in accordance with the purposes of the invention as embodied and broadly described in this document, a method is provided for analyzing an image comprising a plurality of image pixels to detect distortion within the image. According to one aspect, the method comprises a first step of receiving image data for the image, and defining a plurality of blocks within the image data. Each block comprises a plurality of adjacent image pixels. The method includes a second step of prestoring in a machine-readable storage medium a plurality of template data for template pixels corresponding to the image pixels, wherein each of the image pixels has a corresponding center template pixel. The method further includes a third step of testing each of the image pixels within each of the blocks for a match with the template data. This testing includes selectively and iteratively offsetting the template data relative to the center template pixel, and comparing the image pixel under test to each of the offset template data to obtain error statistics. The method also includes a fourth step of using the error statistics to select an offset for each of the blocks which provides an optimum match of the image data in a given block to the template data.

According to another aspect of the invention, the method includes the first and second steps as summarized above. This method further includes a third step of testing each of the image pixels within each of the blocks for a match with the template data. This testing includes: (a) selecting a set of template pixel samples from among the template pixels for the image pixel under test, each template pixel sample set comprising the center template pixel for the image pixel under test and template pixels disposed about the center template pixel, and (b) comparing the image pixel under test to each of the template pixel samples to obtain error statistics, the error statistics for the image pixels being segregated by the blocks. The method also includes a fourth step of using the error statistics to select an offset for each of the blocks which provides an optimum match of the image data in a given block to the template data.

In a preferred version of the method, the image pixels and the corresponding template pixels are organized into rows and columns. Each of the sets of template pixel samples comprises the center template pixel for the given image pixel and template data for template pixels which are located within m rows and within n columns of the center template pixel, where both m and n preferably equal 9. The third step preferably is carried out using m programmable gate arrays operatively coupled to the storage medium, where m in this case is equal to 9, so that the third step as performed for each of the image pixels includes: (i) communicating to each of the gate arrays the template data for one of the template data rows of the template pixel sample set under test so that gate arrays 1 to n receive template data rows 1 to n of the template pixel sample set, respectively, and (ii) within each of the gate arrays, comparing the image data for the image pixel under test to each of the template pixel samples for the template sample row received by that gate array to obtain error statistics. The error statistics for the image pixels are segregated by the image pixel rows and columns for each block and by the respective blocks.

Also in accordance with the invention, an apparatus is provided for operation with an image source for analyzing an image comprising a plurality of image pixels to detect distortion within the image. The apparatus includes input circuitry for receiving image data for the image from the image source, and for defining a plurality of blocks within the image data. Each block comprises a plurality of adjacent image pixels. The apparatus also includes a storage medium operably coupled to the input circuitry for storing a plurality of template data for template pixels corresponding to the image pixels. Each of the image pixels has a corresponding center template pixel. The apparatus further includes a processor for testing each of the image pixels within each of the blocks for a match with the template data. The processor: (a) selects a set of template pixel samples from among the template pixels for the image pixel under test, wherein the template pixel samples comprise the center template pixel for the image pixel under test and template pixels disposed about the center template pixel, (b) compares the image pixel under test to each of the template pixels in the sample set to obtain error statistics, the error statistics for the image pixels being segregated by the blocks, and (c) uses the error statistics to select an offset for each of the blocks which provides an optimum match of the image data in a given block to the template data.

In accordance with a preferred embodiment of the invention, the image pixels and the corresponding template pixels are organized into rows and columns. Each of the sets of template pixel samples comprises the center template pixel for the given image pixel and template data for template pixels which are located within m rows and within n columns of the center template pixel, both m and n again preferably being equal to 9. In this embodiment, the processor includes m programmable gate arrays operatively coupled to the storage medium, m preferably being equal to 9. Each of the gate arrays is operatively coupled to the storage medium to receive the template data for one of the template data rows of the template pixel sample set under test so that the gate arrays 1 to m receive template data rows 1 to m of the template pixel sample set, respectively. Each of the gate arrays compares the image data for the image pixel under test to each of the template pixel samples for the template sample row received by that gate array to obtain error statistics. The error statistics for the image pixels are segregated by the image pixel rows and columns for each block and by the blocks.

BRIEF DESCRIPTION OF THE DRAWINGS

The accompanying drawings, which are incorporated in and constitute a part of the specification, illustrate a presently preferred embodiment and method of the invention and, together with the general description given above and the detailed description of the preferred embodiment and method given below, serve to explain the principles of the invention.

DETAILED DESCRIPTION OF THE PREFERRED METHOD AND EMBODIMENT

Figure 1:
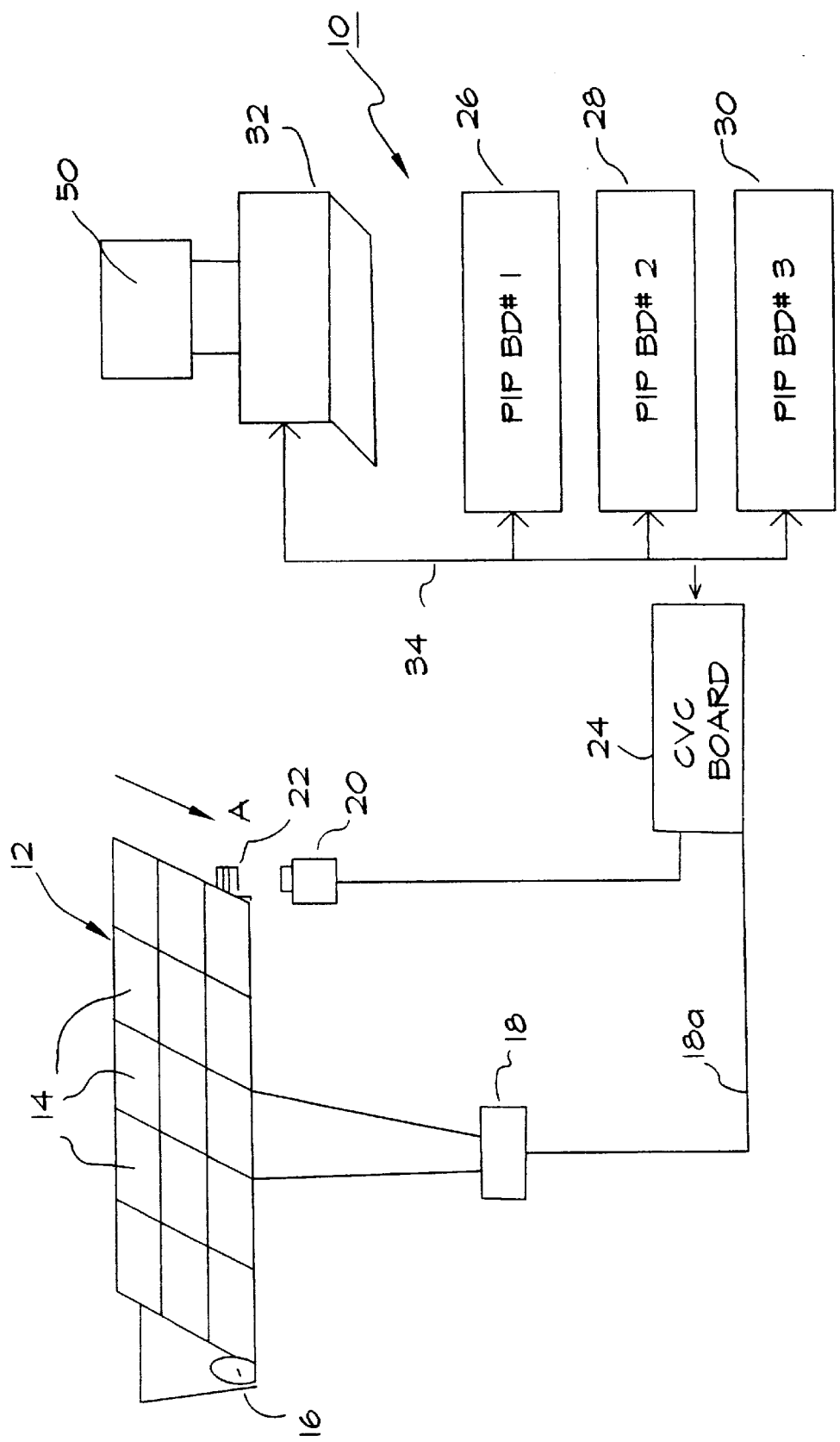
FIG. 1. is a block diagram illustrating the arrangement of components for the preferred embodiment of the invention, and which are used in accordance with the preferred method of the invention.

Reference will now be made in detail to the presently preferred method and embodiment of the invention as illustrated in the accompanying drawings, in which like reference characters designate like or corresponding parts throughout the drawings.

The preferred method and embodiment used to illustrate the principles of the invention involve application in the paper currency industry. More specifically, they are described as they would be used in a quality control capacity to detect and measure the amount of distortion present in the sheets of currency as they emerge from the printing process or post-printing inspection process. The intention of course is not limited to these applications, and will have application in a range of others as well.

In describing the preferred method and embodiment, the following terms will be used according to the definitions set forth here.

"Specimen" refers to the item to be examined or analyzed. Examples would include sheets of currency notes, sheets of labeling, packaging, and other forms of "webs" as the term is used in the printing industry, and portions of these. In the paper currency analysis application presented herein, for example, each of the newly-printed sheets of bank notes as it emerges from the printing process would include a lane of notes, such as dollar bills or one pound notes. Each of these notes would be analyzed separately and would be considered a "specimen" in this application.

"Specimen image" and "image" refer to an image of a specimen created by image reproduction techniques such as digital photography. In the currency analysis application presented herein, a digital image of a newly-printed bank note within a lane on the sheets as they emerge from the printing or inspection process would constitute the specimen image or image. The image in this example would be created by a line-scanning camera, as described below. In this application, the specimen image is represented by grey scale pixel data, each of which comprises a gray scale value for one of the image pixels.

"Template" refers to an idealized version of the specimen image as it would be if the specimen were created perfectly and if the image of the specimen also had been created perfectly, at least within certain predefined tolerances. A template typically will comprise a set of "template data" which represent criteria, such as a range of permissible grey scale values for each of the pixels of the image, for determining whether the image or a portion of the image is sufficiently true to the perfectly-idealized version to be accepted as valid. It is from this template data that the specimen image may be compared to determine the validity or invalidity of the latter. The template data correspond one-to-one or pixel-by-pixel to the pixelized image data. In the currency analysis application presented herein, the template data comprises acceptable or permissible ranges of grey scale values for each of the respective template pixels.

Figure 3:
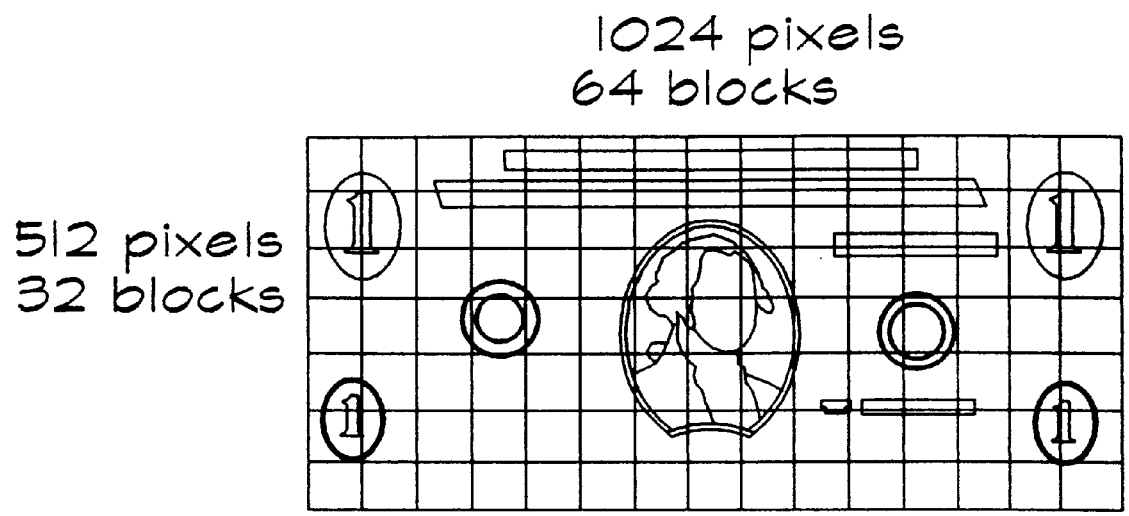
FIG. 3 is an illustration of a specimen, in this case a note of paper currency, with horizontal and vertical lines illustrating the demarcation of the specimen into blocks, fur use in illustrating the preferred method and the operation of the preferred embodiment shown in FIG. 1.

Image processing according to the preferred method and embodiment are carried out on relatively small portions or regions of the specimen image. The regions are processed in steps until the entire image is processed. Based in part on the way in which the specimen image is created, the various image pixels are disposed in rows and columns, as illustrated in FIG. 3. The image data for these pixels correspondingly is organized into rows and columns. In this example, each row includes 1,024 pixels, and each column includes 512 pixels. For present purposes, these image pixels are grouped into square "blocks" of 16×16 adjacent pixels. This yields 64 blocks to a row and 32 blocks to a column, for a total of 2,048 blocks for the image. It should be noted, however, that this is not necessarily limiting, in that blocks having different shapes, such as rectangular, polygonal, circular, etc. are possible.

As with the specimen data, the template data is organized into rows and columns of pixels. The template data includes same numbers of pixels as the image data.

The presently preferred embodiment of the invention 10 is illustrated in block diagram form in FIG. 1. This embodiment is adapted for selectively analyzing a sheet of currency 12 as it emerges from the printing process or as it would be inspected using conveyor-based examination systems known in the industry for such tasks. In practice, the printing or examination process typically would involve serially outputting a plurality of such sheets in succession. In typical modern currency fabrication processes, for example, the output from a single printing or examination machine would comprise about 3 such sheets per minute. Each sheet 12 typically includes 40 notes 14, which notes are organized on the sheet 5 abreast (5 columns) and 8 down the sheet (8 rows). Each of the notes 14 constitutes a specimen as the term is used herein.

The apparatus according to the preferred embodiment is adapted for operation with an image source for analyzing a pixelized image or specimen image, to detect distortion within the image. The apparatus includes input circuitry for receiving image data for the image from the image source, and for defining a plurality of blocks within the image data, wherein each block comprises a plurality of adjacent image pixels.

In the preferred embodiment of the invention, the input circuitry and related system components used for creating the specimen image are of essentially the same design as those currently known and used in the industry. Sheets are fed in continuous or semi-continuous form over a rotating drum 16 for scanning. A plurality of line-scanning cameras 18 are disposed at the location where currency sheets 12 are outputted for obtaining an image of each of the specimens or a portion of it. Only a single camera 18 is shown in FIG. 1, but in the preferred embodiment there would be 10 such cameras, i.e., 5 for each side of sheet 12. The 5 cameras on a given side of sheet would be disposed side by side with their viewing geometries adjusted so that each camera line scans a single column of notes 14 on sheet 12 as the notes move past the camera in the direction shown by arrow A. Actually camera 18 scans slightly greater than the width of a note 14 so there is a small margin on either side.

The scanning of sheets 12 by cameras 18 is synchronized with the rotation of drum 16 and therefore to translational motion of sheets 12. Drum 16 has a circumference of about 800 mm. Encoded along the circumference of drum every 0.1 mm is an index mark 22, so that there are about 8,000 such indexing marks 22 for a resolution of 0.2 mm. A sensor 20 monitors indexing marks 22 as drum 16 is rotated, and generates a pulse each time an indexing mark is encountered. The series of pulses thereby generated is used to trigger camera 18 to perform the line scanning. In this embodiment, camera 18 is triggered once for every other indexing mark 22, for a total of 4,000 line scans for each rotation of drum 16.

Each camera 18 outputs a digital data stream which comprises a plurality of pixel data. The data for each image pixel includes an 8-bit data word comprising a grey scale value for that pixel of the specimen image.

Framing of the image pixel data is accomplished in a known manner, for example, wherein one of the indexing marks 22 on drum 16 is a master index mark. A new frame is initiated in the image data each time a master index pulse from the master index mark is encountered.

The apparatus or system according to this preferred embodiment is designated generally in the drawings as 10. System 10 includes a command and video control ("CVC") board 24, three pipeline image processor (PIP) boards 26, 28 and 30, respectively, a host computer 32, all operatively coupled to one another by a VME bus 34 packaged in a VMEbus Eurocard format. PIP boards PIP #1 through PIP #3 are coupled to one another in series so that they operate in pipeline fashion.

PIP #1 is used to identify image features for global positioning of the image relative to the template. PIP #2 is used to perform distortion-identification processing, and PIP #3 is used to distortion-compensate the template and image with respect to one another, and to undertake validation testing for the note or specimen under analysis.

It should be noted that the collection of components outlined for this system 10 preferably would be provided for each camera 18. That is, one system would be provided for and coupled to each of the 10 cameras used for analyzing sheets of currency using this preferred embodiment.

In accordance with the preferred embodiment, the input circuitry includes CVC board 24. CVC board 24 provides the interface with camera 18, controls scanning control and synchronization with camera 18, and may be adapted to perform other functions as well. This board 24 would be designed, configured and operated in many respects as would video interface control boards commercially available as off-the-shelf components, so this description will provide only an overview.

CVC board 24 according to this embodiment combines several functions, including communications to host computer 32, interface with camera 18, camera lighting linearization, test pattern generation for camera 18, image processor configuration, and image processor diagnostics. Each of these tasks is performed in ways generally known in the field, or in ways which will become readily apparent to those of ordinary skill in the art based on the description of the invention and the preferred embodiment provided herein. CVC board 24 provides compatibility with off-the-shelf line scan cameras with RS422 digital outputs, generates all necessary camera control signals, simplifies the acquisition of line scan data for linerization algorithms, simplifies the logic associated with test patterns, allows the replay of stored images to test new models (the combination of template, masks and fiducials for a particular print design) on the actual system hardware without running printing equipment, provides Ethernet communications for remote control by host computer 32 of model download, configuration, linearization, and board-level diagnostics, and generates digital images for transmission and display on host computer 32. CVC board 24 is completely testable without the image processing circuitry (PIP boards). It facilitates the testing of linescan cameras and the RS422 interfaces to the host computer display. Custom communications can be developed for CVC board 24 and tested in conjunction with host computer 32, also in known fashion.

CVC board 24 is coupled to camera 18 by a parallel or ribbon cable 18a having at least 8 data lines and associated control and error-handling lines as appropriate for the specific application. It receives as an input the signal from indexing sensor 20. That signal, after necessary conditioning, is used to control the line scanning performed by camera 18. CVC board 24 receives the line-scanned image data from camera 18 and performs routine framing and other overhead functions on this incoming data.

In accordance with the invention, a processor is provided for testing each of the image pixels within each of the blocks for a match with the template data. The processor selects a set of template pixel samples from among the template pixels for the image pixel under test, wherein the template pixel samples comprise the center template pixel for the image pixel under test and template pixels disposed about the center template pixel. The processor also compares the image pixel under test to each of the template pixel samples to obtain error statistics, wherein the error statistics for the image pixels are segregated by the blocks. The processor also uses the error statistics to select an offset for the block which provides an optimum match of the image data in the block to the template data. In the preferred embodiment, the processor comprises the PIP boards.

Preferably, the processor includes m programmable gate arrays operatively coupled to the storage medium, where in the embodiment m is equal to 9. According to this preferred design approach, each of the gate arrays is operatively coupled to the storage medium to receive the template data for one of the template data rows of the template pixel sample set under test so that the gate arrays 1 to m receive template data rows 1 to m of the template pixel sample set, respectively, and each of the gate arrays compares the image data for the image pixel under test to each of the template pixel samples for the template sample row received by that gate array to obtain error statistics, the error statistics for the image pixels being segregated by the image pixel rows and columns for each block and by the blocks.

It was noted above that the preferred system embodiment includes three PIP boards 26, 28 and 30 for each system 10. In this preferred embodiment, these three PIP boards have essentially identical construction. Although the size, capacity and perhaps other parameters may vary from board to board depending on the application, the basic components preferably are the same. For simplicity and ease of illustration, the construction of these boards will be described with reference to PIP board #2 (28)(shown in FIG. 2), which is used for image distortion identification processing, but it should be borne in mind that the construction of PIP board #1 (26) and PIP board #3 (30) would be essentially identical to PIP board #2 as shown in FIG. 2, except as noted below.

Figure 2:
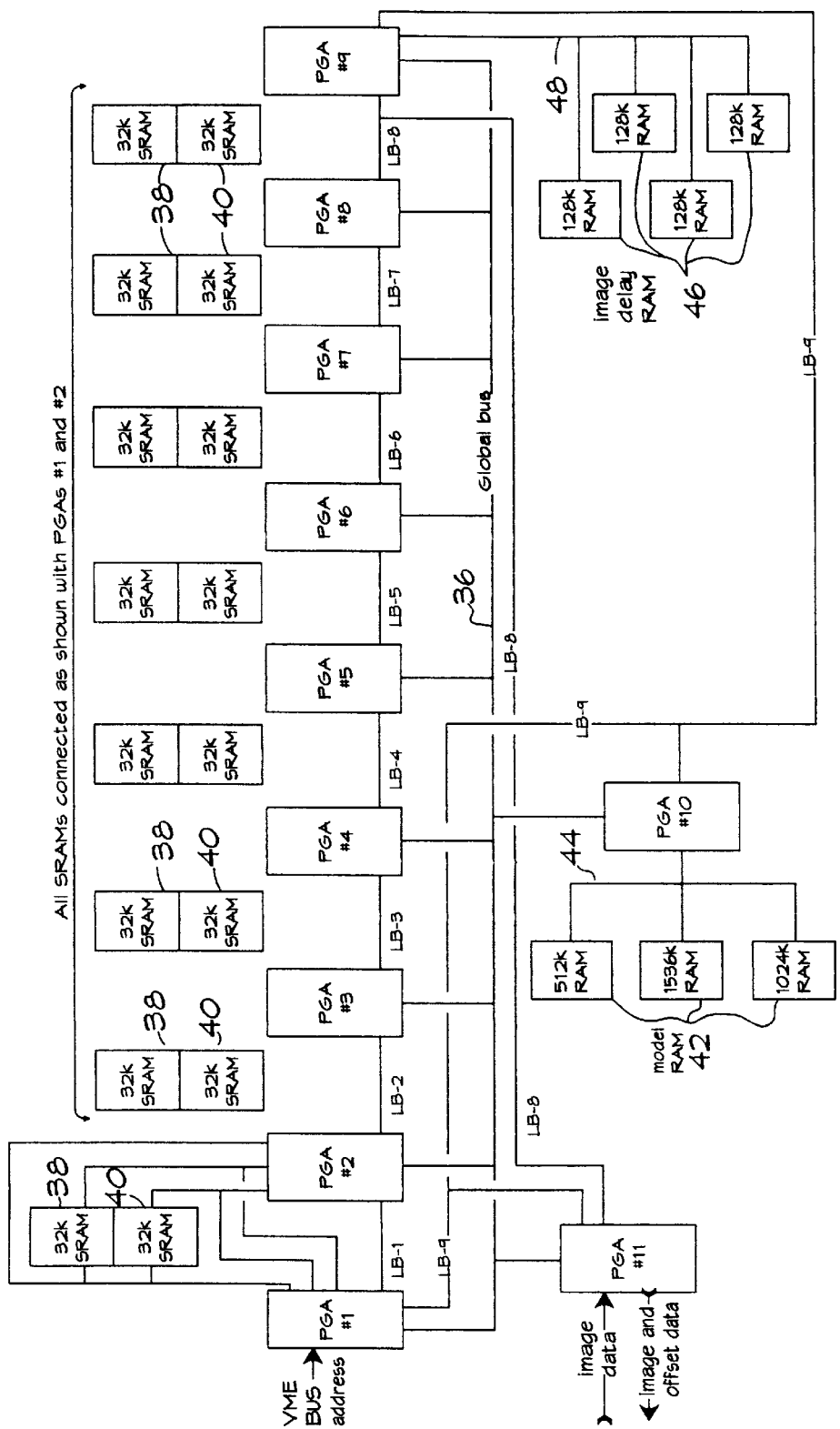
FIG. 2 is a block diagram of the second pipeline image processor board of the preferred embodiment shown in FIG. 1, and also illustrates the construction of the first and third pipeline image processor boards of the preferred embodiment.

Referring now to FIG. 2, PIP board #2 includes a plurality, in this example eleven, of programmable gate arrays ("PGA"), which are designated herein as PGA #1, PGA #2, PGA #3, . . . PGA #11. All eleven of the PGA's are essentially identical design and construction. They are standard off-the-shelf PGAs readily obtainable from a number of commercial sources. The PGAs selected for use should have capacity for at least about 12,000 logic gates, and they should have sufficient input-output capability to handle the pixelized data and associated data transfers as described herein.

In this preferred embodiment and in the preferred method, the image data comprise a gray scale value for each of the image pixels, and the template data comprise a permissible gray scale range for each of the template pixels. Accordingly, in the preferred embodiment the processor includes logic gates for comparing the gray scale value for the image pixel under test to the permissible gray scale range for each of the template pixel samples to obtain the error statistics. These logic gates are provided by the integral logic gate arrays within each of the PGAs, and particularly within PGAs #1 through #9.

PGAs #1 and #11 are coupled directly to VME bus 34. All eleven PGAs are coupled to one another via a global bus 36. Each of the PGAs #1 through #9 is coupled to its immediately adjacent PGA via a local bus ("LB"). For example, PGA #1 is coupled to PGA #2 via bus LB-1, PGA #2 is coupled to PGA #3 via bus LB-2, and so on. PGA #8 is coupled by bus LB-8 to PGA #11. PGA #9 is coupled to PGA #10, PGA #11 and PGA #1 via bus LB-9. Flexibility is designed into the system with this use of global bus and the local bus, e.g., because data can be transferred via more than one path. This feature can be effectively utilized to optimize data transfer and associated processing times for a given application. In this preferred embodiment, global bus is used primarily for transferring image data, the local bus is used primarily to transfer "best scores" or "best fit" data between PGAs, as described more fully below.

In accordance with the preferred embodiment, each of the gate arrays includes a FIFO memory for storing a portion of the template data. More specifically, and with reference to FIG. 2, each of the PGAs #1 through PGA #9 has associated with it and coupled to it a first-in-first-out ("FIFO") memory, i.e., FIFO #1, FIFO #2, and so on. Each FIFO comprises two sets of 32-kilobyte static random access memory ("SRAM") modules 38 and 40. These FIFOs serve to temporarily store template data for a given row of template pixels during image processing for that template pixel row, as described more fully below. SRAMs 38 and 40 are standard, off-the-shelf and commercially-available SRAM memory chips. Their storage capacity of course may vary from application to application. Each SRAM includes address, data and control lines, and it is addressable from the PGAs to which it is directly coupled. FIFO #1 thus is coupled to PGA #1 and PGA #2 to selectively provide data to PGA #1 and PGA #2, FIFO #2 is coupled to PGA #2 and PGA #3 to selective provide data to PGAs #2 and #3, and so on. The specific manner in which the data is transferred amount the FIFOs and PGAs for PIP #2 of this preferred embodiment and method will be described more fully below. According to the preferred embodiment and method, counters are used to compile error statistics throughout distortion-related image processing. There is flexibility in the specific selection and arrangement of the counters. For example, in these illustrative examples the image pixel blocks are divided into r block rows and s block columns, preferably where r=32 and s=64. Therefore, in one approach the processor would include a set of m×n counters for each of the s blocks within a given block row, where m is the number of rows and n is the number of columns in a set of template pixel samples. In this manner, each set of m×n counters maintains the error statistics for a single block within a given block row.

In an alternative approach, and one which is implemented in the preferred embodiment and method, each of the gate arrays includes s sets of n counters, where s is the number of blocks along a row of blocks. With this configuration, each set of n counters maintains the error statistics for a single block within a given block row.

PIP board #2 uses counters to count the number of errors that occur in attempting to match the image data to the template data. Specifically as to this embodiment, each PGA of PIP board #2 has programmed into or implemented within it 576 separate counters. More specifically, each PGA is implemented with 9 counters (one for each of 9 columns of a template pixel row) for each of the 64 blocks of image data in a given row of image data blocks. Each of the counters in this embodiment has the capacity to count up to 256.

The apparatus according to the invention includes a storage medium operably coupled to the input circuitry for storing a plurality of template data for template pixels corresponding to the image pixels. With reference to the preferred embodiment, this storage medium is provided in the form of a model RAM 42 on PIP board #2. Model RAM 42 is coupled to PGA #10 via a local bus 44. Model RAM 42, which in this embodiment comprises three RAM modules (512K, 1,536K and 1,024 K chips, respectively), prestores template data to be used in image processing according to the preferred method.

In addition, PIP board #2 includes an image delay RAM 46 which comprises four 128K RAMs, each of which is coupled to PGA #9 via a local bus 48.

It will be appreciated that the sizes and arrangement of model RAM 42 and image delay RAM 46 may vary from application to application, from system to system, and from board to board. It would be possible, for example, to use a single RAM chip of appropriate capacity for model RAM and/or image delay RAM depending on the circumstances, chip availability, the designer's preferences, etc.

PGA #11 is coupled to VME bus to receive specimen image data, and to transmit distortion-corrected image and offset data to PIP board #3, as described more fully below.

The system 10 according to the preferred embodiment is under the general control of host computer 32. Host computer 32 comprises a Sun Sparc station operating under the Solarix (UNIX) multi-user, multi-tasking operating system. It includes a display 50 with an "open systems" Motif user interface. It may be adapted to include a network model database accommodating a management information system. Host computer 32 is coupled to CVC board 24 and to PIP boards 26, 28 and 30 via VME bus 34. Host computer 32 can be used for a variety of functions, such as preparation and management of template data. In this preferred embodiment, however, host computer 32 is not used directly in the distortion-related image processing of the specimens.

We now turn to the preferred method of the invention. For ease of illustration, the preferred method will be described as it might be carried out using the preferred embodiment of the invention as shown in the drawing figures. It should be appreciated, however, that the method of the invention is not limited in this sense. It could be implemented, for example, using other apparatus and configurations, as those of ordinary skill in the art will understand from the following illustrative examples, and therefore is not limited to that shown and described herein.

The preferred method will be described with reference only to a single camera 18, again for ease of illustration but not by way of limitation. Even for purposes of this preferred method, the process preferably would be carried out identically for each of the 10 cameras as discussed above. Reference to a single camera here is sufficient to convey the design and operation of the preferred embodiment and method, keeping in mind that the other cameras would be configured and operate in the same manner as camera 18.

Generally speaking, the method of the invention involves analyzing the image data to obtain a distortion measure for each block of the image. This is done here, however, by: (a) making image pixel-by-image pixel measurements for the image pixels of each block, (b) taking the best scores for each block, and (c) obtaining from those best scores a distortion measure for the block, also referred to herein as an "offset" or an "offset vector."

In the preferred method, processing occurs and error statistics are collected in the counters for all of the image pixels within a given row of blocks. Upon the completion of this processing for the row, the error statistics are used to obtain a distortion measure (offset or offset vector) for each block along that row of blocks. The counters are reset and processing begins on the next set of image pixel rows for the next block row. Processing thus is done on a pixel-by-pixel basis down each row from left to right, and down the image pixel rows from top to bottom, and for each block by rows of blocks from top to bottom.

The method of the invention includes prestoring in a machine readable storage medium a plurality of template data for template pixels corresponding to the image pixels. Each of the image pixels has a corresponding center template pixel. Specifically with regard to the preferred method, prior to image processing, template data for the template, i.e., the idealized version of the specimen image, here of a single note 14 of currency from sheet 12, is prestored within model RAM 42. Each datum of the template data comprises two values, i.e., a lower range limit and an upper range limit, of gray scale values, for each template pixel. These two values define a permissible range in which the gray scale value for the corresponding image pixel will be accepted as valid. Any gray scale value outside this permissible range will give rise to an "error count" as explained more fully below. The specific values of the various template data will depend upon the specific application, the tolerance or variance permitted by the system user in that particular application, etc. This template range values may be adjusted from time to time, e.g., by storing a different set of template data, by adjusting the values within model RAM 42, and by other means.

During this system initialization stage, the counters are set to zero. In this preferred method, all of the steps following this initialization processing procedure are performed in a continuous, pipeline fashion until there are no more specimens to be analyzed and the system and method are terminated.

According to the method of the invention, image data for the image is received, and a plurality of blocks within the image data are defined, wherein each block comprises a plurality of adjacent image pixels. With reference to the preferred method, camera 18 under the control of CVC board 24 line scans the individual notes as they pass by in the direction shown by arrow A during the printing or quality control analysis procedure. As they do, camera 14 line scans each specimen (a single note) in a raster scan fashion. This generates pixelized specimen image data for the 1024×512 pixels of each specimen, and into frames of pixel data, as described above. Each pixel comprises an 8-bit word which represents the gray-scale intensity of the portion of the specimen image corresponding to that pixel. The pixelized image data is communicated via bus 18a to the input of CVC board 24.

From CVC board 24, the image data is communicated to the input of PGA #11, via global bus 36 to PGA #9, and on to image delay RAM 46. This image data receiving step continues until the image data for an entire specimen image is stored within image delay RAM 46.

At this stage, and as an optional but preferred step, a prealignment step of prealigning the image data relative to the template data may be carried out. This prealignment step preferably would be carried out after the template data has been prestored and at least a portion of the image data for a given image under test has been received and stored in image delay RAM 46.

In accordance with the preferred method, a global prealignment procedure is carried out to provide coarse or preliminary alignment of the image data relative to the template data. This global alignment may be carried out in a number of ways which are known in the industry. A preferred technique involves using one or more regions of principal interest within the image which are easily identified and provide good contrast sensitivity relative to the surrounding area to measure dislocation. In the currency analysis application, for example, this approach may involve the use of features from the image of the person whose face appears at the center of the currency note, and/or the numbers at the corners of the note which identify its face value. As an illustrative example, a "binary correlation" technique could be used at this stage to measure the dislocation. This processing preferably would be performed using PIP board #1, appropriately configured and programmed to perform these known tasks, as would be understood by persons of ordinary skill in the art. With this technique, an algorithm is performed in the PGAs of PIP board #1 in known manner to locate the specific portions of the image data which correspond to the region of interest based on their relative gray scale values. The template data where these regions of interest occur are predetermined. Their locations therefore can be compared quite readily with the image data for the region of interest, and a dislocation measured. The actual alignment may be carried out in a number of known ways, for example, such as by changing the "location" of the template data by changing the addresses by an amount corresponding to the dislocation.

At this stage, dislocation measurement image processing according to the invention is ready to be carried out for the specimens. According to the method of the invention, this processing involves testing each of the image pixels within each of the blocks for a match with the template data. The testing includes selectively and iteratively offsetting the template data relative to the image pixel under test, and comparing the image pixel under test to each of the offset template data to obtain error statistics.

According to another aspect of the invention, the testing includes selecting a set of template pixel samples from among the template pixels for the image pixel under test, each template pixel sample set comprising the center template pixel for the image pixel under test and template pixels disposed about the center template pixel, and comparing the image pixel under test to each of the template pixel samples to obtain error statistics, the error statistics for the image pixels being segregated by the blocks.

In accordance with the preferred method, the image data and template data are simultaneously shifted through the system in pipeline fashion so that each pixel of image data is compared with the plurality of template data located within a region or block about the corresponding image data pixel location to obtain a goodness of fit or dislocation measure. The analysis is facilitated by dividing the image up into a plurality of blocks as the term has been defined above. The goodness of fit measures are compared on a pixel-by-pixel basis for each block to obtain a "best fit" location for each block of template data. This best fit location can be used directly to obtain a dislocation vector for each template block. The set of dislocation vectors thereby obtained may be used, for example, to adjust the template data blocks before overall specimen image goodness fit of the entire image is performed.

In the implementation of the preferred method, which again is carried out in semi-continuous pipeline fashion, a set of steps are repeated sequentially in time essentially as follows:

(a) template data for a selected set of n rows are loaded into the PGA—FIFO combinations;

(b) the image data pixels for a given image data row are tested one pixel at a time against this selected set of template data;

(c) template data for the next set of n rows, shifted relative to those of step (a) by one template data row, are loaded into the PGA—FIFO combination;

(d) the image data pixels for the next image data row are tested one pixel at a time against this next set of template data; and so on until essentially all rows of the image data have been thus processed.

Turning to the specific implementation using the system of FIG. 2, dislocation measurement processing according to the preferred method begins by transferring the first 9 consecutive rows of template data (rows 1–9) from model RAM 42 to PGAs #1 through PGA #9 via global bus 36 under the control of PGA #10. It will be appreciated that this transfer may be accomplished via several specific routes using the relatively flexible hardware configuration depicted in FIG. 2.

With respect to each row of template data thus transferred, the 1,024 pixels comprising the row of template data are transferred through the respective PGA and into the corresponding FIFO so that the first 9 pixels in the template data row TD(i,j=1–9) initially are loaded into the input of the PGA, and the remaining 1,015 pixels of that template data row are loaded sequentially into the corresponding FIFO. In this specific example, template data for template data row 1 would be in PGA #1 and FIFO #1, template data for template data row 2 would be in PGA #2 and FIFO #2, and so on through row 9.

Incidentally, to facilitate reference to specific image pixels ("IP") and template pixels ("TP"), vector relation will be used in which, for example, IP(i,j) would refer to the image pixel in row i and column j. TD(i, j=1–9) refers to the template pixels in row i and column positions 1 through 9.

With the appropriate subset of the template data loaded as described immediately above, the system is ready for processing of image data. Given that template data rows 1–9 are loaded, and for reasons which will become apparent shortly, image data for image data row 5 are read out of image delay RAM 46 sequentially along the row, from left to right. As this specimen image data is read out, each image pixel is processed sequentially from the first image pixel in the row to the last. For a given image pixel, the data (gray scale value) is loaded into the input of each of the 9 PGAs of PIP board #2, i.e., essentially simultaneously.

Image pixel processing is performed in this preferred method by testing each image pixel against its corresponding center template pixel, but also against other template pixels in a set of template pixel samples. The template pixels thus are dislocated from but in the general vicinity of the center template pixel. Preferably, each of the sets of template pixel samples comprises the center template pixel for the given image pixel and template data for template pixels which are located within m rows and within n columns of the center template pixel, where m is the number of template pixel rows in the template pixel sample set and n is the number of columns of template pixels in the set. In the preferred embodiment and method, both m and n are equal to 9. According to the preferred method, each of the image pixels IP(i,j) for the given row i is tested against a generally-corresponding set of the template data for goodness of fit or, conversely, for local distortion, by comparing it with the template data. More specifically, and with reference to FIG. 4, a given image pixel IP(i,j) is tested against the corresponding or "center template pixel" TP(i,j) to determine whether the gray scale value for that image pixel is within the permissible range of the template pixel. If it is within the range, there is no "error." If the image pixel gray scale value is outside the permitted range for that template data pixel, an "error" is generated.

The testing of a given image pixel IP(i,j), however, is not carried out only for center template pixel (i,j). Instead, a search is conducted throughout an n×m pixel region of template pixels about center template pixel TP(i,j) to determine whether a better match may be had by template pixels displaced from TP(i,j). The template pixels within this region, including the center template pixel, form a "sample set" of template pixels. Each of the sets of template pixel samples comprises the center template pixel for the given image pixel and template data for template pixels which are located within m rows and within n columns of the center template pixel. This sample template pixel set thus varies for each image pixel. In this preferred method, the region for a template pixel sample set comprises a square region plus and minus four template data pixels from the center template pixel TP(i,j), i.e., TP(i=i±4, j=j±4). Including the center pixel TP(i,j), this involves testing each image data pixel IP(i,j) over a square region of 9×9, or 81, pixels about the unique center template data pixel TP(i,j) for that image data pixel IP(i,j). The specific size and shape of the region may vary depending upon the specific application, and therefore are not necessarily limiting.

It can now be appreciated why we started with image data row 5, IP(5,j), namely to accommodate edge effects. By varying the column location of the template data pixels by 4, TP(i=5±4, j), template data up to and including template data row 1 will be tested. The testing of image data pixels in rows 1 through 4 would give spurious results because the full range of template data could not be tested to the full extent. These same edge effect concerns arise with respect to the first and last 4 columns for a given image data row. Therefore, in this preferred method image processing starts with the fifth image pixel of the row, IP(i,5) and ends with the fifth image pixel from the end of the row, IP(i,1,020). Again, as those of ordinary skill in the art will appreciate, there are various approaches which could be brought to bear to address these edge effects, and the method in this sense is not hereby limited.

The specific design and configuration of the counters as described above for the preferred embodiment now will be appreciated as well. You will recall that each of PGAs #1 though #9 has associated with it 9×64 or 576 counters. Each of the 9 counters is used for maintaining the error count for a given relative template data location within the block under test, i.e., for each of the 9 template data locations or dislocations corresponding to TP(i, j=j±4).

The concept of the "center template data block" also may be introduced at this point. It has been explained above that for present purposes the image data is organized into image data blocks, wherein each block comprises a 16 pixel by 16 pixel square region. The center template pixel for a given image pixel is the uncompensated or nominal template pixel from the template which corresponds directly to the image pixel based upon their assigned locations. The center template data block or for a given image data block is an uncompensated or nominal 16 pixel by 16 pixel square block of template pixels which corresponds directly to the image data block based upon their assigned locations. Uncompensated in each of these uses means uncompensated for distortion, but an uncompensated image center template pixel or center template data block may have undergone preliminary alignment as discussed above. The center template data blocks have significance as will be seen below in that the dislocation vectors as measured by the system may be applied to these center template data blocks to obtain a distortion-compensated template, in which distortion has been compensated on a block-by-block basis.

In the preferred embodiment and method, the testing step is carried out using m programmable gate arrays operatively coupled to the storage medium. This testing step includes: (i) communicating to each of the gate arrays the template data for one of the template data rows of the template pixel sample set under test so that gate arrays 1 to n receive template data rows 1 to n of the template pixel sample set, respectively, and (ii) within each of the gate arrays, comparing the image data for the image pixel under test to each of the template pixel samples for the template sample row received by that gate array to obtain error statistics, the error statistics for the image pixels being segregated by the image pixel rows and columns for each block and by the blocks.

Figure 4:
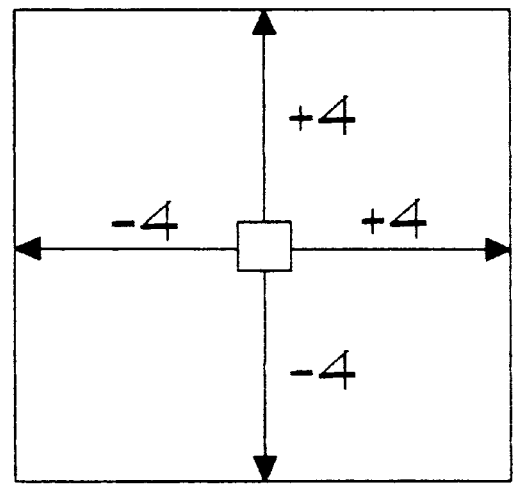
FIG. 4 illustrates the manner in which each image pixel from the specimen image is tested against a range of template pixel values from a template in accordance with the preferred embodiment and method.

Returning to the preferred method as it would be carried out in PIP board #2 (FIG. 2), image pixel IP(5,5) is loaded into the input registers of PGAs #1 through #9. Each PGA then conducts a goodness of fit test for each of the 9 loaded template pixels TP (i, j=5±4) for its designated template data row by comparing the image pixel gray scale value to the template pixel range for each of the 9 template pixels in this sample set to determine whether or not there is a match (no error) or an error. Viewing all 9 PGAs #1 through #9 together, this essentially involves testing the image pixel under test against 81 possible template pixel locations, TP (i=5±4, j=5±4), as illustrated in FIG. 4. In the event of an error, the counter for the respecting PGA and that relative template data position would be incremented. For example, if image pixel IP(5,5) fails to fall within the template data range for template pixel TP(1,1), i.e., TP(i=5−4, j=5−4), an error would result for PGA #1 and the corresponding counter would be incremented. Again, after each of the PGAs #1 through #9 has processed the first image pixel IP(5,5) for each of its 9 loaded template data pixels, PIP board #2 effectively has completed the testing of that image pixel IP(5,5) for all 81 locations including the center template pixel TP(5,5) and the surrounding template pixels TP(i=5±4, j=5±4).

At this stage, each of the FIFOs transfers to its corresponding PGA the template pixel data (sample set) for the next template pixel in the row, so that the 9 template pixels resident in the PGA are shifted by 1 relative to the immediately preceding set. The PGAs are now ready to begin processing on the next image pixel in the row under test. In this example, the image pixel under test would be IP(5,6), and the template data in PGAs #1 through #9 would be TP(i=1,2,3 . . . 9, j=6±4), respectively. The tests for image pixel IP(5,6) are carried out as described above for image pixel IP(5,5). The counters of the respective PGAs are incremented for each error.

This procedure of (a) shifting the template data in the respective PGAs #1 through #9 by one template pixel to the right, along the template data row, (b) inputting the next image data pixel of the image data row, (c) testing the 9 template data positions for the 9 PGAs (81 positions), and (d) incrementing the appropriate counters for errors, is repeated for the sequential ones of the image data in that image pixel row until all of the image data for that row except the first four and the last four (to avoid edge effects) have been tested. Preferably, testing is carried out for all of the image pixels within a given image pixel row before testing the image pixels of another row, and testing the image pixel rows are performed sequentially.

Using this testing procedure, the m gate arrays are used to substantially simultaneously test a given image pixel within the given block for the m template data rows and n template columns of the template pixel sample set. Sets of the columnar template pixels are tested sequentially for each of the image data pixels within the given block, advancing one column of template pixels at a time.

At this point, we are ready to begin processing a new row of image pixels. Accordingly, template data for the next set of template pixel rows, shifted downwardly by 1 row, are loaded into the PGA—FIFO combinations. To illustrate, and continuing with the example, the next image pixel row would be image pixel row 6, IP(i=6,j). Therefore, template pixel or data rows 2 through 10, i.e., TP(i=6±4, j), would be loaded into PGAs #1 through #9 and the corresponding FIFOs, respectively. Initially the first 9 template pixels of the row would be loaded into the PGA, and the remaining 1,015 would be stored within the corresponding FIFO.

Processing then would be undertaken for each image pixel of image pixel row 6, just as described above for image pixel row 5. The full 81 positions would be tested for each image pixel of row 6, and the counters would be incremented as errors are encountered, again as described above. It will be noted that the counters for a given block will continue to be incremented for errors without resetting until testing for all image pixels within the given block has been completed. The same sets of counters are used in the same manner for each image pixel until the image pixel block is fully tested.

According to the preferred method, the error statistics for each of the image pixel rows and columns of each block are used to determine an offset for each block which represents the distortion within that block. It has been noted that the image pixels are divided into blocks for processing purposes in this preferred method. Each block is 16 image pixels along a row and 16 image pixels along a column. The processing as described will be completed for a given image pixel block when all of the image pixel rows within that block have been tested. Most of these image pixel blocks will involve 16 rows although, as noted above, some blocks may have fewer to accommodate edge effects.

The method aspect of the invention further includes a step of using the error statistics to select an offset for the block which provides an optimum match of the image data in the block to the template data. With reference to the preferred method, when a given image pixel block is completed, "best fit" processing is performed by the PGAs of PIP board #2 to determine the template data dislocation for each center template data block which best matches the image data block. The 81 counters for each block of that block row are used to select the minimum error count or best fit. Preferably both x and y, or row and column, offsets are considered. This yields on offset vector for each template block of the template block row which represents the best fit to the image block data.

Each of PGAs #1 through #9 is pre-programmed to analyze its 9 counters per block to determine which template pixel dislocation created the fewest errors and therefore provided the best fit. In addition, each of these PGAs is pre-programmed to perform this analysis for the 9-counter sets of all 64 image data blocks for a give image data block row. Once determined, PGAs #1 through #9 transfer these error statistics to PGA #11, which compiles and stores the results.

At this stage, because testing has been completed for all image data pixels of the given image data block row, processing continues by resetting all s×n counters as the testing for each of block rows is completed. With regard to the embodiment of FIG. 2, the 64×9 counters in PGAs #1 through #9 are reset to zero, and processing is ready to begin anew with the next image data block row, moving from top row to bottom row, i.e., for the next image pixel block row.

As testing is completed for the final image block row, the final set of error statistics are similarly transferred to PGA #11, thus yielding within PGA #11 a complete set of error statistics and, correspondingly, a set of "best fit" template data dislocations or offset vectors, i.e., one for each uncompensated center template data block.

Having carried out the procedure thus far yields a set of 2,048 (64 column×32 row) offset vectors, i.e., one for each center template data block. These offset vectors then may be used to adjust the center template data blocks to obtain a distortion-corrected template for that specimen image. For example, each of the offset vectors includes a row and column component. A distortion-compensated specimen image could be obtained by displacing each pixel within a given block of the original specimen image by the offset vector, i.e., so that the row location of the pixel is offset by the row component of the offset vector and the column location of the pixel is offset by the column component of the offset vector. The distortion-corrected specimen image then can be compared to the specimen image using a variety of techniques well known in the field to determine if the images sufficiently match so the specimen may be deemed valid or invalid. Gaps which are created between template blocks may be ignored, or they may be accommodated in ways dependent on the application and objectives.

Additional advantages and modifications will readily occur to those skilled in the art. For example, in the illustrative embodiment and examples the distortion compensation vectors are applied to adjust the template data. It will be appreciated, however, that distortion measurement and compensation is relative as between the image and the template. Therefore, one could adjust the image pixels or image data in various places where the template data is described as being adjusted with essentially equal result.

Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A method for analyzing an image comprising a plurality of image pixels to detect distortion within the image, the method comprising:

a first step of receiving image data for the image, and defining a plurality of blocks within the image data, each block comprising a plurality of adjacent image pixels;

a second step of prestoring in a machine readable storage medium a plurality of template data for template pixels corresponding to the image pixels, each of the image pixels having a corresponding center template pixel;

a third step of testing each of the image pixels within each of the blocks for a match with the template data, the testing including selectively and iteratively offsetting the template data relative to the center template pixel, and comparing the image pixel under test to each of the offset template data to obtain error statistics; and a fourth step of using the error statistics to select an offset for each of the blocks which provides an optimum match of the image data in a given block to the template data.

2. A method for analyzing an image comprising a plurality of image pixels to detect distortion within the image, the method comprising:

a first step of receiving image data for the image, and defining a plurality of blocks within the image data, each block comprising a plurality of adjacent image pixels;

a second step of prestoring in a machine readable storage medium a plurality of template data for template pixels corresponding to the image pixels, each of the image pixels having a corresponding center template pixel;

a third step of testing each of the image pixels within each of the blocks for a match with the template data, the testing including (a) selecting a set of template pixel samples from among the template pixels for the image pixel under test, each template pixel sample set comprising the center template pixel for the image pixel under test and template pixels disposed about the center template pixel, and (b) comparing the image pixel under test to each of the template pixel samples to obtain error statistics, the error statistics for the image pixels being segregated by the blocks; and a fourth step of using the error statistics to select an offset for each of the blocks which provides an optimum match of the image data in a given block to the template data.

3. A method as recited in claim 2, wherein each of the blocks comprises a square region of contiguous image pixels.

4. A method as recited in claim 3, wherein the image pixels are disposed in rows and columns, and the square region comprises 16 contiguous rows of the image pixels by 16 contiguous columns of the image pixels.

5. A method as recited in claim 2, wherein:

the image data comprise a gray scale value for each of the image pixels; and the template data comprise a permissible gray scale range for each of the template pixels.

6. A method as recited in claim 2, further including a prealignment step of prealigning the image data relative to the template data, this prealignment step being performed prior to the third and fourth steps.

7. A method as recited in claim 2, wherein:

the image pixels and the corresponding template pixels are organized into rows and columns;

each of the sets of template pixel samples comprises the center template pixel for the given image pixel and template data for template pixels which are located within m rows and within n columns of the center template pixel; and the third step is carried out using m programmable gate arrays operatively coupled to the storage medium, so that the third step as performed for each of the image pixels includes, (i) communicating to each of the gate arrays the template data for one of the template data rows of the template pixel sample set under test so that gate arrays 1 to n receive template data rows 1 to n of the template pixel sample set, respectively, (ii) within each of the gate arrays, comparing the image data for the image pixel under test to each of the template pixel samples for the template sample row received by that gate array to obtain error statistics, the error statistics for the image pixels being segregated by the image pixel rows and columns for each block and by the blocks.

8. A method as recited in claim 7, wherein m and n are equal to 9.

9. A method as recited in claim 7, wherein the fourth step comprises using the error statistics for each of the image pixel rows and columns of each block to determine an offset for each block which represents the distortion within that block.

10. A method as recited in claim 7, wherein the third step includes associating with each of the gate arrays a FIFO memory for storing a portion of the template pixel samples.

11. A method as recited in claim 7, wherein:

the first step includes dividing the blocks into r block rows and s block columns; and the third step includes providing a set of m×n counters for each of the s blocks within a given block row, so that each set of m×n counters maintains the error statistics for a single block within a given block row.

12. A method as recited in claim 7, wherein:

the first step includes dividing the blocks into r block rows and s block columns; and the third step includes providing each of the gate arrays with s sets of n counters, so that each set of n counters maintains the error statistics for a single block within a given block row.

13. A method as recited in claim 12, wherein:

the third step includes testing all of the image pixels within a given image pixel row before testing the image pixels of another row, and testing the image pixel rows sequentially.

14. A method as recited in claim 12, wherein the third step includes resetting the s×n counters as the testing for each of block rows is completed.

15. A method as recited in claim 7, wherein the third step includes using the m gate arrays to substantially simultaneously test a given image pixel within the given block for the m template data rows and n template data columns of the template pixel sample set.

16. A method as recited in claim 7, wherein the third step includes testing each of the n template columns of the template pixel sample set sequentially for each of the image data pixels within the given block.

17. An apparatus for operation with an image source for analyzing an image comprising a plurality of image pixels to detect distortion within the image, the apparatus comprising:

input circuitry for receiving image data for the image from the image source, and for defining a plurality of blocks within image pixels;

a storage medium operably coupled to the input circuitry for storing a plurality of template data for template pixels corresponding to the image pixels, each of the image pixels having a corresponding center template pixel; and a processor for testing each of the image pixels within each of the blocks for a match with the template data, the processor
(a) selecting a set of template pixel samples from among the template pixels for the image pixel under test, the template pixel samples comprising the center template pixel for the image pixel under test and template pixels disposed about the center template pixel,
(b) comparing the image pixel under test to each of the template pixel samples to obtain error statistics, the error statistics for the image pixels being segregated by the blocks, and
(c) using the error statistics to select an offset for each of the blocks which provides an optimum match of the image data in a given block to the template data.

18. An apparatus as recited in claim 17, wherein:

the image data comprise a gray scale value for each of the image pixels;

the template data comprise a permissible gray scale range for each of the template pixels; and the processor includes logic gates for comparing the gray scale value for the image pixel under test to the permissible gray scale range for each of the template pixels of the sample set to obtain the error statistics.

19. An apparatus as recited in claim 17, wherein:

the image pixels and the corresponding template pixels are organized into rows and columns;

each of the sets of template pixel samples comprises the center template pixel for the given image pixel and template data for template pixels which are located within m rows and within n columns of the center template pixel; and the processor includes m programmable gate arrays operatively coupled to the storage medium, wherein
(i) each of the gate arrays is operatively coupled to the storage medium to receive the template data for one of the template data rows of the template pixel sample set under test so that the gate arrays 1 to m receive template data rows 1 to m of the template pixel sample set, respectively, and
(ii) each of the gate arrays compares the image data for the image pixel under test to each of the template pixel samples for the template sample row received by that gate array to obtain error statistics, the error statistics for the image pixels being segregated by the image pixel rows and columns for each block and by the blocks.

20. An apparatus as recited in claim 19, wherein each of the gate arrays includes a FIFO memory for storing a portion of the template pixel samples.

21. An apparatus as recited in claim 19, wherein:

the blocks are divided into r block rows and s block columns; and the processor includes a set of m×n counters for each of the s blocks within a given block row, so that each set of m×n counters maintains the error statistics for a single block within a given block row.

22. An apparatus as recited in claim 19, wherein:

the blocks are divided into r block rows and s block columns; and each of the gate arrays includes s sets of n counters, so that each set of n counters maintains the error statistics for a single block within a given block row.

23. An apparatus as recited in claim 19, wherein the m gate arrays substantially simultaneously test a given image pixel within the given block for the m template data rows.

24. An apparatus as recited in claim 19, wherein the gate arrays test the n template data columns of the template pixel sample set substantially simultaneously for each image data pixel.

* * * * *